May 6, 1952
F. B. ALLEN
2,595,218
INFLATION VALVE
Filed May 4, 1945
2 SHEETS—SHEET 1
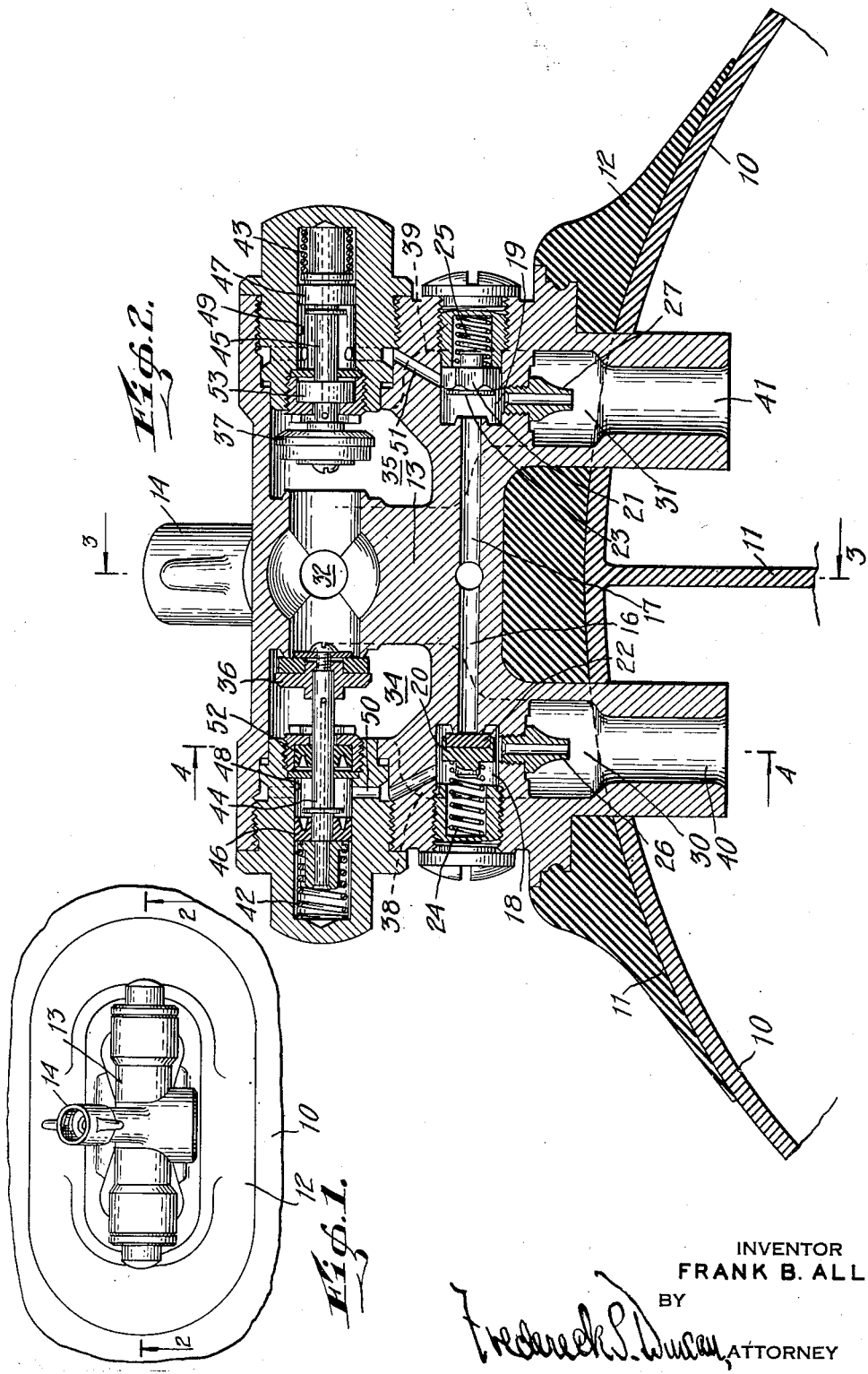
INVENTOR
FRANK B. ALLEN
BY
*Frederick P. Dulcey* ATTORNEY

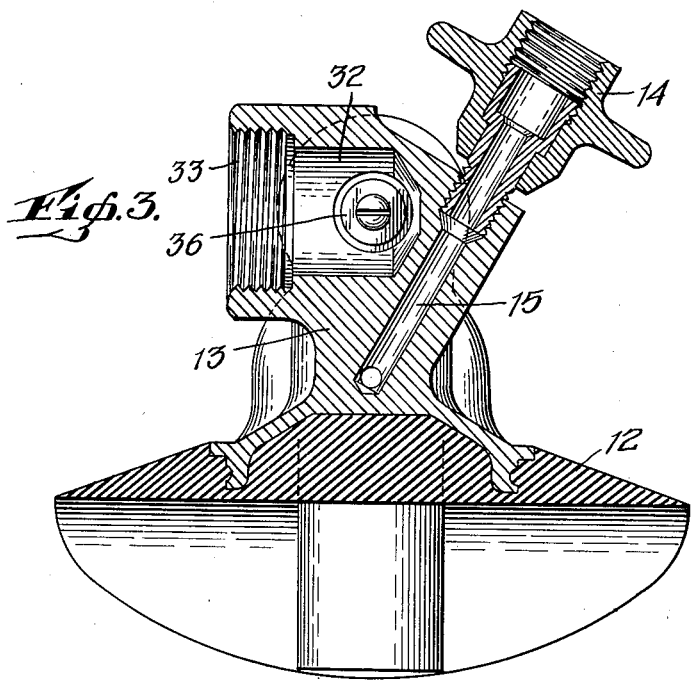
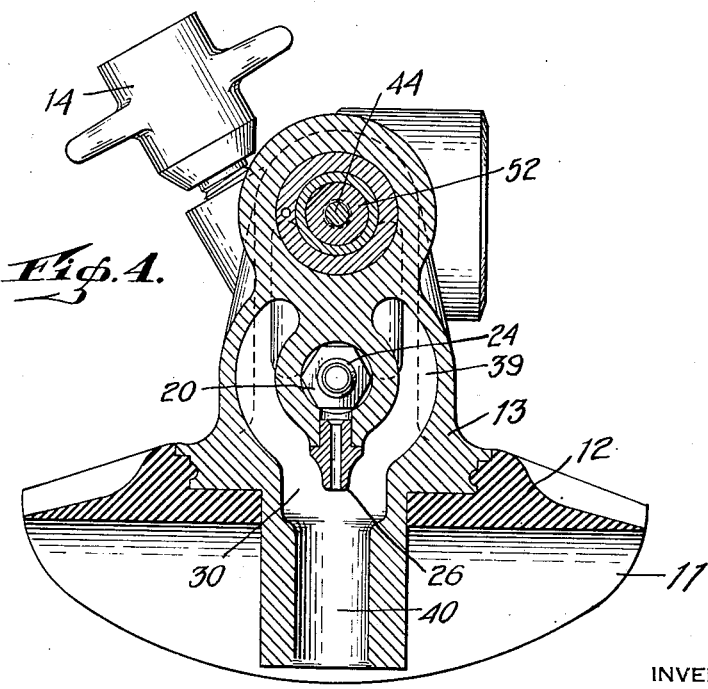

Patented May 6, 1952

2,595,218

UNITED STATES PATENT OFFICE 2,595,218

INFLATION VALVE

Frank B. Allen, Verona, N. J., assignor to C-O-Two Fire Equipment Company, Newark, N. J., a corporation of Delaware Application May 4, 1945, Serial No. 592,009

4 Claims. (Cl. 137—21)

This invention relates to the inflating of hollow articles, and more particularly to the inflation of rubber boats, life rafts, and analogous articles.

The life rafts and rubber boats carried by aircraft are customarily inflated when needed by the utilization of a compressed or liquefied gas which is stored in containers. In order to keep the weight of the cylinder and its contained fluid down, it has been proposed to utilize the energy of the released fluid flowing to the interior of the rubber boat to entrain air, thus decreasing the requirements of stored gas. This also serves to help prevent the formation of carbon-dioxide snow, in the event carbon-dioxide is the inflating medium, as the large amount of air entrained raises the temperature of the expanding gas above that temperature it would have if the air were not present.

In utilizing the kinetic energy of a fluid issuing from a jet or nozzle for moving a volume of air, it is desirable that the air flow be as unrestricted as possible. This is because free air flow will increase the ratio of air to gas, with attendant advantages. Ordinary check valves which depend upon the movement of the air to open them inherently restrict the flow to some extent, and about the only way they can be made operative with comparatively low pressure differences is by increasing their size and utilizing light springs to keep them shut. Both of these expedients have a tendency to decrease reliability.

It is therefore a primary object of the present invention to provide an improved means for inflating hollow articles by the use of compressed gas admixed with atmospheric air.

It is a further object of the present invention to provide a valve means for the inflating of hollow articles which is positive in action.

It is a further object of the present invention to provide a valve means for the inflating of hollow articles by the entrainment of air in a jet of released fluid in which the flow of gas and air is unrestricted by valves.

Referring now to the drawings:

Fig. 1 is an elevation of one form of my invention, as installed on a life raft;

Fig. 2 is an enlarged sectional view taken on line 2—2 of Fig. 1;

Fig. 3 is a section taken on line 3—3 of Fig. 2; and

Fig. 4 is a similar section along line 4—4 of Fig. 2.

Briefly, the invention about to be described employs a pair of valves for each compartment to be inflated, one closing the passage from the supply of compressed or liquefied gas, and the other closing the passage from the outside atmosphere to the interior of the hollow object to be inflated. Both of these valves are operated by the pressure of the compressed gas, remaining open until the pressure of the incoming gas drops below a predetermined amount as the supply becomes exhausted, after which the valves are closed by spring action.

Referring to the drawings more in detail, a portion of the raft is shown in distended condition at 10. As can be seen the raft is composed of two separate compartments, separated by an impervious diaphragm 11. A rubber pad or base 12 is vulcanized or otherwise secured to the fabric of the raft and serves to support the valve means forming the subject-matter of this invention.

This valve means comprises a body portion 13 suitably formed as by casting and machining to define the necessary passages. A coupling ring 14 is furnished with internal threads to engage corresponding threads on the source of compressed gas (not shown). A passage 15 leads into the body 13, and bifurcates to form two branches 16 and 17, leading to the valve chambers 18 and 19.

Valves 20 and 21 serve to keep the passages 16 and 17 normally closed, as at the left half of Fig. 2, which shows the position of all parts as they are when no gas is flowing into the raft. The parts on the right of the figure are in the position they take while the raft is being inflated, it being understood of course that actually all parts are either as on the left or on the right at any one time.

As can be seen in Fig. 4, these valve members are non-circular in cross-section, which permits gas to pass between them and the walls of the chamber, while the contact between the corners of the valve and the chamber walls serves to properly position the valves. Suitable washers 22 and 23 cooperate with the valve seats to form a gas-tight joint when the valves are closed. Springs 24 and 25 normally close the valves to prevent passage of gas or air from the chamber to the passages 16 and 17.

Leading from the chambers are nozzles 26 and 27, which discharge into mixing chambers 30 and 31. The passage of fluid from the point of entry through coupling 14 is thus through the passage 15, through the branches 16 and 17, past the valves 20 and 21 into chambers 18 and 19, and out through the nozzles 26 and 27. Reverse flow is of course prevented by the valves 20 and 21.

In order to admit air into the mixing chambers 30 and 31, a passage 32 to the atmosphere is made. As shown, this may be provided with internal threads 33 to receive a suitable hose, a plug or a hand-operated pump, for reinflating the raft by hand in the event that it is damaged while in the water.

This passage 32 is also bifurcated, and the branches lead to the valve chambers 34 and 35. Valves 36 and 37, provided with washers bearing on valve seats formed in the ends of the chambers serve normally to prevent passage of air in either direction. The valve chambers are connected to the mixing chambers 30 and 31, by means of the passages 38 and 39, thus establishing passages from the air inlet opening to the mixing chambers, which are in turn open through passages 40 and 41 to the interior of the life raft.

In order to keep the valves 36 and 37 normally closed, springs 42 and 43 are provided, which, through valve stems 44 and 45, urge the valves to the position shown for valve 36.

In order to open the valves 36 and 37 when inflating the raft, pistons 46 and 47 are attached to the valve stems, working in the cylinders 48 and 49. Ports 50 and 51 lead from the valve chambers 18 and 19 to these cylinders, and, upon the opening of the valves 20 and 21 under the pressure of fluid flowing through the passages 16 and 17, a pressure is created against the face of each piston, forcing it to the position of the piston 47. This, of course, raises the air valves from their seats, and permits passage of air from the inlet 32 to the interior of the raft. Packing rings 52 and 53 prevent the gas from escaping from the cylinders 48 and 49. In order to relieve the pressure in back of the pistons 44 and 45, the piston stems are drilled longitudinally, and also transversely just back of the valve faces 36 and 37, thus preventing compression of air within the spaces back of the pistons.

The operation of my improved device should now be clear. Upon the release of highly compressed or liquefied gas into the passage 15, such gas finds its way to the nozzles 26 and 27. At the same time, inasmuch as the nozzles create some back pressure, the pistons 46 and 47 move outwardly, opening the air valves 36 and 37. The velocity of the fluid issuing from the nozzles causes air to be drawn through the mixing chambers and entrained with the fluid, the mixture being discharged to the interior of the raft. When the pressure of the fluid supply drops sufficiently, the valves 20 and 21 are closed by their springs, and the air valves are also closed by their springs.

It will be understood that because the compression energy of the gas is used to open the air valves, it is a comparatively easy matter to make springs 24 and 25 stiff enough to assure positive closing, and, at the same time, inasmuch as the air valves are not opened by air movement, they offer little obstruction to air flow, and the maximum amount of air will be drawn into the interior of the raft.

The above description is of a preferred embodiment of my invention but it is to be understood that I do not wish to be limited to the particular description illustrated and that the scope of this invention is best construed by means of the following claims:

I claim:

1. An inflator valve comprising a housing, inlet means in the housing for a pressure fluid, inlet means in the housing for atmospheric air, outlet means for the pressure fluid and air, injector means in the pressure fluid inlet to draw air inwardly through the air inlet, a normally closed pressure seated valve for the air inlet and adapted to be held in the closed position by the pressure of fluid from the outlet, pressure operated opening means for the air inlet valve responsive to pressure ahead of the injector means, and pressure operated closing means adapted to act in opposition to the pressure operated opening means and responsive to pressure beyond the injector means, whereby the air inlet valve is opened by a predetermined difference in pressure across the injector means.

2. An inflator valve comprising a housing, inlet means in the housing for a pressure fluid, inlet means in the housing for atmospheric air, outlet means for the pressure fluid and air, injector means in the pressure fluid inlet to draw air inwardly through the air inlet, a normally closed pressure seated valve for the air inlet and adapted to be held in the closed position by the pressure of fluid from the outlet, pressure operated opening means for the air inlet valve responsive to pressure ahead of the injector means inlet, pressure operated closing means adapted to act in opposition to the pressure operated opening means and responsive to pressure beyond the injector means, and a normally closed pressure opened valve for the pressure fluid inlet responsive to pressure externally of the pressure fluid inlet, whereby the inflator valve is automatically conditioned to pass both pressure fluid and air through its outlet upon the application of fluid of a predetermined pressure to its pressure fluid inlet and to close off the air flow through its outlet upon a predetermined difference in pressure across the injector means.

3. An inflator valve comprising a housing, means providing a horizontally extending pressure fluid inlet, means providing a horizontally extending atmospheric air inlet, means providing a downwardly extending pressure fluid and air outlet, an injector means for each outlet at the head thereof, a check valve to close the pressure fluid inlet and adapted to be unseated by pressure of incoming fluid, resilient means for the check valve to seal it against incoming fluid pressure below a predetermined amount, fluid passage means leading from the pressure fluid inlet after the check valve to the injector means, fluid passage means leading from the air inlet to the outlet at its injector means, an air inlet valve to close the air inlet against the pressure of the incoming fluid, resilient means for the air inlet valve to tend to seat it against incoming fluid pressure, a piston for the air inlet valve, a piston rod to operatively connect the piston with the valve, fluid passage means leading from the inlet after the check valve to one side of the piston so that pressure fluid tends to move the piston to air inlet valve opening position, and fluid passage means leading through the piston rod from the outlet to the other side of the piston, whereby the inflator valve is automatically conditioned to pass both pressure fluid and air through its outlet upon the application of fluid of a predetermined pressure to its pressure fluid inlet and to close off the air flow through its outlet upon a predetermined difference in pressure across the injector means.

4. An inflator valve comprising a housing, means providing a horizontally extending inlet manifold leading to a pair of oppositely positioned inlets for a pressure fluid, a horizontally extending inlet manifold leading to a pair of oppositely positioned inlets for atmospheric air, means providing a pair of downwardly extending outlet, an injector means for each outlet at the head thereof, a pair of oppositely positoned check valves to close the pressure fluid inlets and adapted to be unseated by pressure of incoming fluid, resilient means for each check valve to seat it against incoming fluid pressure below a predetermined pressure, fluid passage means leading from each pressure fluid inlet after its check valve to an injector means, fluid passage means leading from each air inlet to an outlet at its injector means, a pair of oppositely positioned air inlet valves to close the air inlets against the pressure of the incoming fluid, resilient means for each air inlet valve to tend to seat it against incoming fluid pressure, a piston for each air inlet valve, a piston rod to operatively connect each piston with its valve, fluid passage means leading from each of the pressure fluid inlets after its check valve to one side of each of the pistons so that pressure fluid therein tends to move the piston to air inlet valve opening position, and fluid passage means leading through the piston rod from each of the outlets to the other side of each of the pistons, whereby the inflator valve is automatically conditioned to pass both pressure fluid and air through its outlets upon the application of fluid of a predetermined pressure to its pressure fluid inlets and to close off the air flow through its outlets upon a predetermined difference in pressure across the injector means.

FRANK B. ALLEN.

REFERENCES CITED

The following references are of record in the file of this patent:

UNITED STATES PATENTS

| Number | Name | Date |
|---|---|---|
| 845,063 | Desper | Feb. 26, 1907 |
| 1,184,271 | Ten Eyck | May 23, 1916 |
| 1,253,005 | Conran | Jan. 8, 1918 |
| 1,988,635 | Sutton | Jan. 22, 1935 |
| 1,994,124 | Deutsch et al. | Mar. 12, 1935 |
| 2,208,662 | Clark | July 23, 1940 |
| 2,320,011 | Reynolds | May 25, 1943 |
| 2,341,618 | Humphreys | Feb. 15, 1944 |